(12) United States Patent
Natarajan et al.

(10) Patent No.: US 9,110,926 B1
(45) Date of Patent: Aug. 18, 2015

(54) SKEW DETECTION FOR VERTICAL TEXT

(71) Applicants: Adarsh Natarajan, Kerala (IN); Viswanath Sankaranarayanan, Chennai (IN); Sairam Reddi, Chennai (IN)

(72) Inventors: Adarsh Natarajan, Kerala (IN); Viswanath Sankaranarayanan, Chennai (IN); Sairam Reddi, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 240 days.

(21) Appl. No.: 13/671,495

(22) Filed: Nov. 7, 2012

(51) Int. Cl.
  *G06K 9/18* (2006.01)
  *G06F 17/30* (2006.01)
  *G06K 9/00* (2006.01)

(52) U.S. Cl.
  CPC ...... *G06F 17/30256* (2013.01); *G06K 9/00221* (2013.01); *G06K 9/18* (2013.01); *G06K 9/183* (2013.01)

(58) Field of Classification Search
  CPC ....... G06K 9/18; G06K 9/186; G06K 9/3208; G06K 2209/01; G06K 9/3283; G06T 3/606
  USPC .......................... 382/182, 296, 174, 177, 290
  See application file for complete search history.

(56) References Cited

U.S. PATENT DOCUMENTS

| 5,854,853 A * | 12/1998 | Wang ............................. 382/176 |
| 2011/0052094 A1 * | 3/2011 | Gao et al. ..................... 382/296 |
| 2012/0128249 A1 * | 5/2012 | Panjwani et al. ............. 382/177 |

* cited by examiner

*Primary Examiner* — Ruiping Li
(74) *Attorney, Agent, or Firm* — Lowenstein Sandler LLP

(57) ABSTRACT

A method for detecting and correcting skew in scanned vertical text includes identifying an image of vertically oriented characters, and identifying a plurality of vertical lines corresponding to character positions of the vertically oriented characters in the image. The method further includes generating an average slope of a subset of the plurality of lines, and causing the image to be deskewed based on the average slope.

19 Claims, 9 Drawing Sheets

SKEW DETECTION FOR VERTICAL TEXT

BACKGROUND

Japanese, Chinese, and Korean texts, as well as some other language texts, are rendered vertically instead of horizontally, as in Latin or Cyrillic texts and many other languages. In vertical text, characters are arranged in vertical lines, so that when a user reads the characters, the next character is either above or below the current character. Many documents and books containing such vertical text are increasingly in demand for eReaders.

Traditional optical character recognition and other eReader preparation software are typically designed for texts of Roman character schemes, which are horizontal. Scanning vertical texts for conversion to an eReader format can introduce errors because it is difficult to correctly align the page being scanned with sufficient accuracy to the horizontal and vertical axis of the scanner. Insufficient accuracy of scans can produce translation and rotation defects, skew, or character drift. For example, skew correction that provides accuracy within 1 in 100 may be insufficient for high quality electronic books.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein are methods, systems, and non-transitory computer-readable storage media for skew detection and correction in scanned vertical text. Skew is the rotation or change in orientation of the page away from the proper vertical orientation. One common source of skew is improper or insufficiently accurate alignment of a document in a scanner. When vertical text is skew corrected, the output from optical character recognition (OCR) can be used to generate electronic books, or eBooks, for accurate display on electronic reading devices, or eReaders. The examples set forth herein are discussed in terms of Japanese text, but can be applied to any language in which characters may appear in a vertical orientation. Further, the same principles can be applied to documents with horizontal text as well as documents with a mixture of horizontal and vertical text. For the sake of simplicity, the examples and embodiments set forth herein focus primarily on vertical text.

Figure 1:
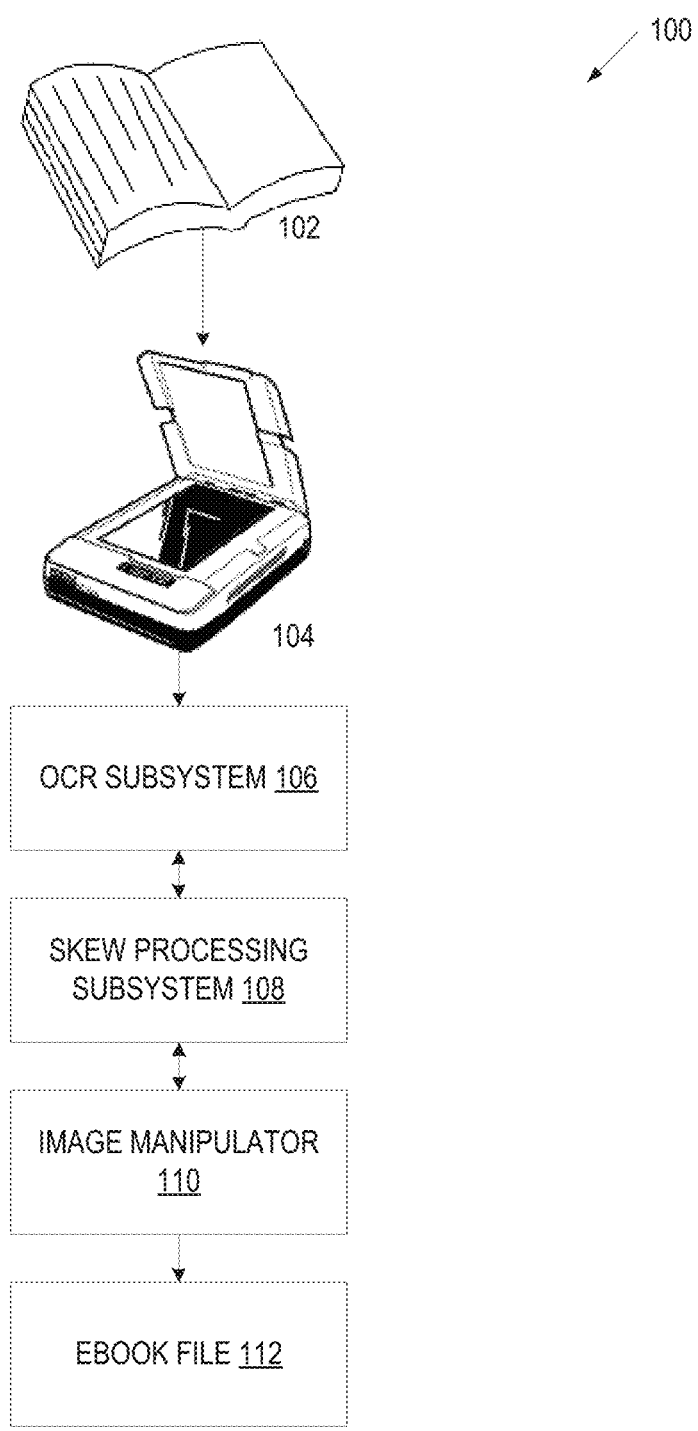
FIG. 1 illustrates an example architecture for adapting printed material for display on electronic devices.
Figure 2:
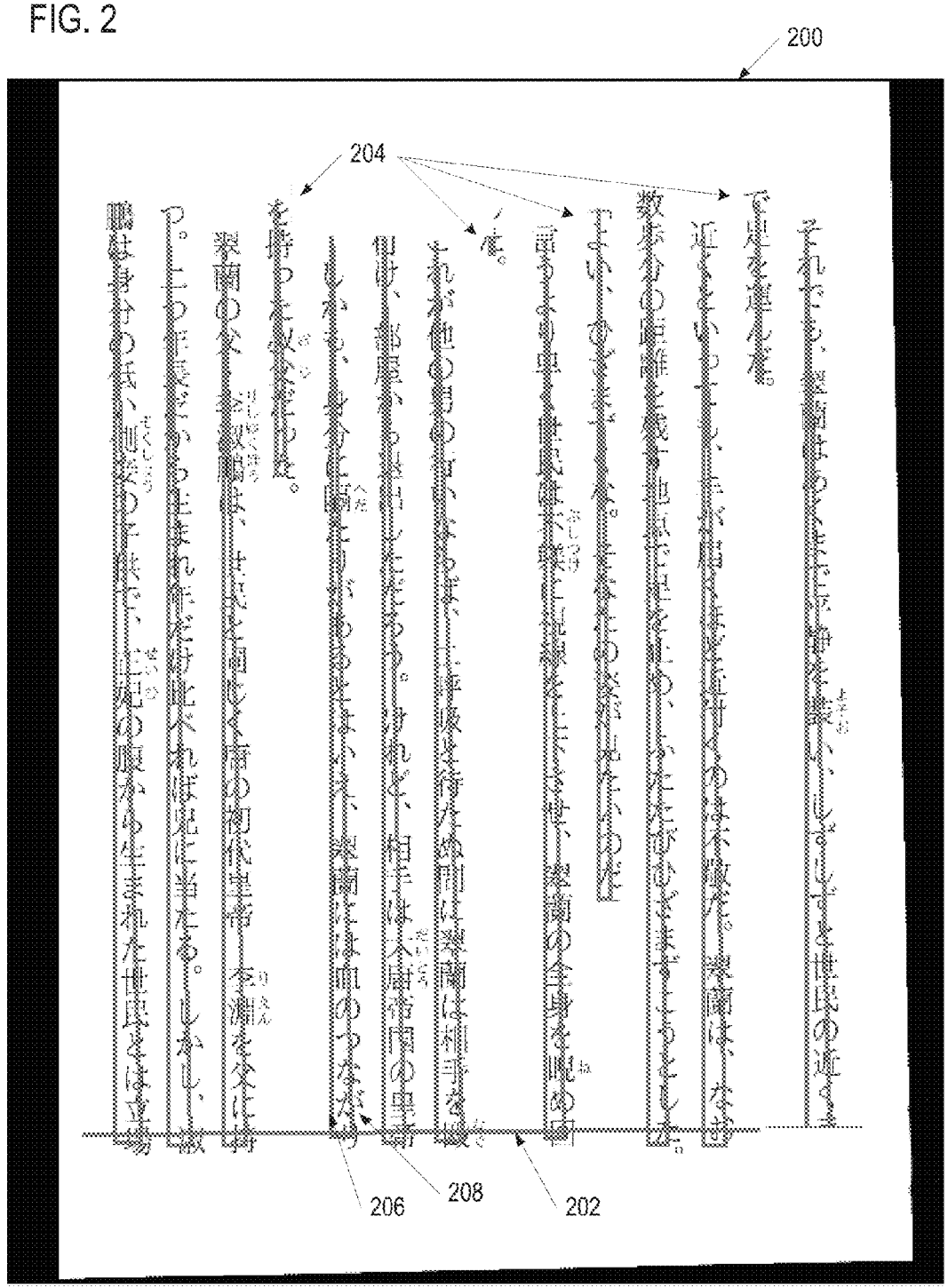
FIG. 2 illustrates a scanned image of example skewed vertical Japanese characters.
Figure 3:
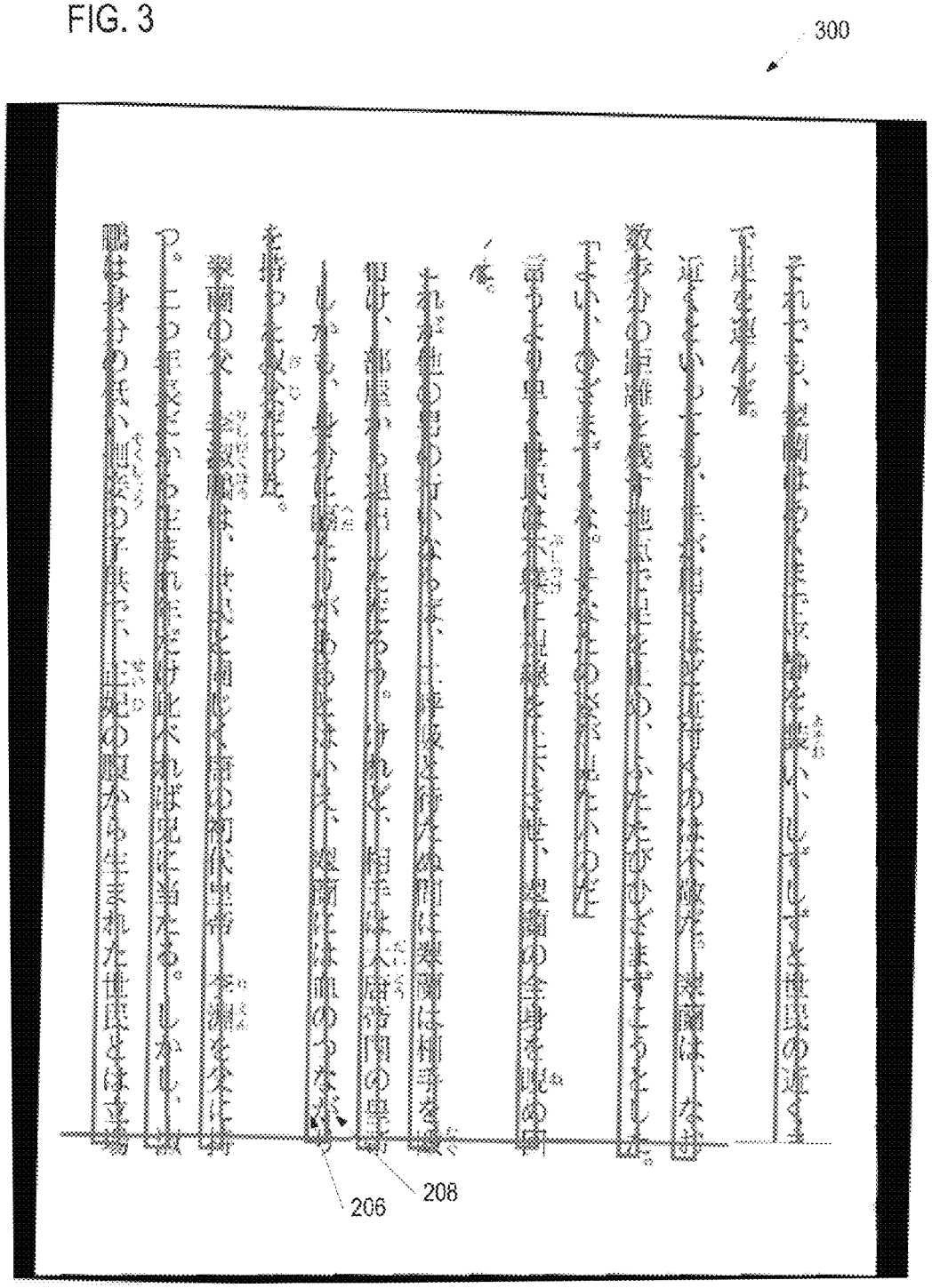
FIG. 3 illustrates a scanned image of example deskewed vertical Japanese characters.

FIG. 1 illustrates an example architecture 100 for adapting printed material of vertical characters for display on electronic devices, and deskewing scanned printed material. Printed text, in particular text of East Asian languages such as Japanese, is adapted for rendering on electronic displays or other suitable graphical display devices while maintaining the formatting and layout of the vertical text as originally printed. Printed material 102 contains the text as published. The printed material 102 may be a book, magazine, newspaper, poster, card, brochure, advertisement, or other physical object. Alternatively, the printed material 102 may be an electronic file that contains a representation of the text as it would be presented on a physical page. For example, the printed material 102 may be represented as a picture or page image such as, for example, a tagged image file format (TIFF) file, a JPEG file, or a portable document format (PDF) file. FIG. 2, which is discussed below, illustrates an example source scanned document that is skewed and that contains vertical text. FIG. 3, which is also discussed below, illustrates the example source scanned document of FIG. 2 after skew detection and correction.

In implementations in which the printed material 102 is a physical object such as a book, a scanner 104 may generate a scan (e.g., an image data file and/or other data files) from the printed material 102. The scanner 104 may be any device capable of capturing images including but not limited to a video camera, scanner, digital camera, copier, scanning pen, etc. The scanner 104 may include a coordinate system defined by the hardware or software of the scanner 104 that consists of numeric values for horizontal and vertical distances from a reference location on the scanner bed such as the top left corner. Other coordinate systems can be used as well. Thus, the scanner 104 may assign horizontal and vertical positions to images detected by the scanner 104 and the locations of images may be described in reference to arbitrary baselines such as the top edge or left edge of the scanner bed.

The OCR subsystem 106 can be integrated in a computing device or software package, or can be a third party OCR subsystem. The OCR subsystem can determine positions of each character present in the page and their location. Further, the OCR subsystem can determine, generate, or identify a set of baseline values which are the imaginary lines on which characters rest, corresponding to line 208 in FIG. 2. When the OCR subsystem 106 does not provide this information, the system can determine the baseline values independently of the OCR subsystem 106, as set forth below with respect to FIG. 2.

Scans generated by the scanner 104 may be image-based files of pages of the printed material 102, for example. The image-based representation may capture characters from the printed material 102 as images rather than as specific characters or letters of a particular language. These scans may be received by an optical character recognition (OCR) subsystem 106 for recognizing text or other characters in the images. In implementations in which the printed material 102 is an electronic file, the electronic file may be received by the OCR subsystem 106 directly without use of the scanner 104. In either implementation, the OCR subsystem 106 receives an electronic representation of text as it is intended to appear on a printed page.

The OCR subsystem 106 may be any type of computing device or multiple computing devices, such as a desktop computer system, a server, a supercomputer, a notebook computer, a tablet computer, an eBook reader, a smart phone, and the like. The OCR subsystem 106 can include software modules, hardware modules, or a combination thereof. For example, the OCR subsystem 106 may include a geometry analysis module for analyzing geometric features of the text, such as character layout, margins, and the like.

A skew processing subsystem 108 can operate on the output from the OCR subsystem 106 and can optionally interact directly or indirectly with the OCR subsystem 106 to identify vertical characters in the source material 102. The vertical characters can be all or part of a page, and can reside on the same page as text in other orientations, such as horizontal text and vertical text on the same page. The skew processing subsystem 108 can determine skew of the scanned page using trigonometric functions for a representative line, for example. The representative line is a line selected to represent the skew of the entire page. The representative line can be identified using a statistical approach. For example, an image of a scanned page can be skewed at a 5 degree angle counterclockwise, so that characters near the top of the page are close to the intended location, but characters at the bottom of the page are noticeably farther away, even though the angle is the same. In one embodiment, the skew processing subsystem identifies the representative line by finding the orientation of all lines in the page, information about which can be derived from baseline value and shape of the line. The system can define horizontal and vertical offsets for each line as the difference of the horizontal and vertical corner boundaries of the line from the baseline respectively. The coordinate value closer to the baseline is considered to be the orientation of the line. A line with a large ratio of letter height to line height is determined to be vertical, and a low ratio of letter height to line height is determined to be horizontal. If no orientation is available, the system can carry forward the orientation of the previous line. The system can divide lines into groups, and use lines of the largest group to determine skew. The system can further examine only those lines that exceed a threshold, such as the top 70% of the longest lines, or only lines that are greater than the median length of all lines in the page. The system can use one or more of such thresholds to improve accuracy of skew detection.

The skew processing subsystem 108 can detect the appropriate skew of the scanned image, and pass the skew as a parameter to an image manipulator 110 that rotates, deskews, or otherwise manipulates the scanned image to correct the detected skew in the scanned image. FIG. 2 illustrates a skewed document image, and FIG. 3 illustrates a corrected, or deskewed, document image. After the scanned image is deskewed, the system can output an eBook file 112 based on the scanned image and the recognized vertical text. Although referred to as an eBook file 112, the eBook file 112 can alternatively contain text from any type of source document including but not limited to books, and can further contain images, animations, rendering preferences, formatting information, fonts, default settings such as a default page size, and so forth.

Any number of display devices may then render the eBook file 112, such as a display screen of an eBook reader from which a consumer can view the text. Different display devices can render the same eBook file 112 differently due to differing screen sizes, zoom levels, user preferences, and so forth. The display devices incorporated into an eBook reader, a notebook computer, or other device rendering the eBook file 112 may be any type of typical display device such as a liquid crystal display, a cathode ray tube display, a bi-stable display (e.g., electronic ink), or the like. Display devices can render the eBook file via an eBook reader application, for example.

FIG. 2 illustrates example skewed vertical Japanese characters, such as a scanned image 200 from a Japanese text. Typically skewed images are caused by a page in a book being scanned at a slight angle or rotation. As the angled black outline on the bottom and right of the scanned image 200 indicate, this image has a certain degree of skew. This image shows various Japanese characters in a vertical orientation, and also shows various lines. For example, line 206 indicates a perfectly vertical line, while line 208 indicates the actual positioning of the characters, which is skewed away from the perfectly vertical line 206. The system can generate or calculate the perfectly vertical line 206. The skewed line 208 can be provided by an OCR system in one embodiment. In another embodiment, the system receives the character positions, and can determine the skewed line 208 based on the character positions. For example, the system can examine the arrangement and proximity of the character positions to determine that a string of characters is forming a column. The system can analyze the center positions of each of the string of characters to generate the skewed line 208. Alternatively, the system can identify the top and bottom characters in a column and can calculate the skewed line 208 using the centers of those two characters as the ends of the skewed line 208.

Line 202 indicates the median line length of all or some of the lines. The system can calculate or determine the median line length 202 based on a subset of all the lines. For example, one way to increase accuracy is to ignore lines that are shorter than a length threshold, such as the short lines 204. Production of high quality eBooks is based on highly accurate digital source materials. Skewed source scanned images can negatively impact the quality and accuracy of resulting electronic documents based on the scanned images. In one embodiment, the system detects skew by applying the inverse of the trigonometric tangent operation to the ratio of total drift between the positions of the first and last character of a line, of a paragraph, or of an entire page. More information, and therefore higher accuracy, is provided if the denominator in the ratio is larger. In other words, longer lines can produce higher accuracy output. While shorter lines 204 can provide some information about the skew of the page, their accuracy may be less than that of the longer lines. So ignoring shorter lines 204 can provide a benefit of increased accuracy, and can provide a benefit of decreasing the number of lines to process. In one embodiment, the system averages only those slopes which account for more than a certain percentage of all slopes. After the system determines the average skew of the appropriate lines, the system can deskew the image based on the average skew. The deskewed image can be used to generate an eBook or other electronic representation of the scanned document.

FIG. 3 illustrates a deskewed scanned image 300 of example deskewed vertical Japanese characters with the lines indicated as in FIG. 2. The deskewed image 300 shows how after deskewing, line 208 is perfectly vertical, while the previously vertical line 206 is now skewed. The lines carried over from FIG. 2 are for demonstrative purposes only and are not part of the output of the deskewed scanned image 300. The system can additionally perform other operations on the deskewed scanned image 300 or the text recognized from the scanned image, such as image clean-up, text editing, and so forth.

Figure 4:
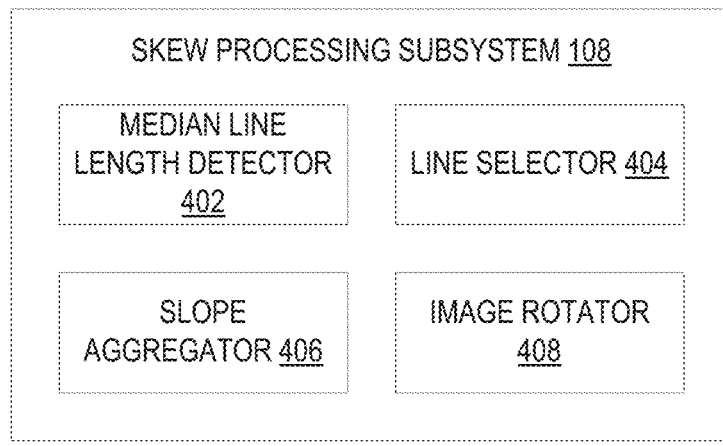
FIG. 4 illustrates a block diagram of an example skew processing subsystem as shown in FIG. 1.

FIG. 4 illustrates a block diagram of an example skew processing subsystem 108 as shown in FIG. 1. The example skew processing system 108 can optionally include a median line length detector 402, a line selector 404, a slope aggregator 406, and an image rotator 408. The median line length detector 402 can receive a list of detected lines from an OCR subsystem or can otherwise identify lines in the scanned page, and can determine lengths for the lines. The system can identify lines in the scanned page based on character positions, orientation, direction, layout, proximity to other characters, metadata in the document, an indication from a human operator, and so forth. Based on the distribution of line lengths, the median line length detector 402 can determine the median, or the numerical value separating the bottom half of the line lengths from the upper half of the line lengths. In other embodiments, the line selector 404 can determine and select lines using other approaches that are not based on the median line length, such as the line length shared by the largest number of lines (i.e., the mode), or the top N or top N-th percentile of the longest lines. As an example, the line selector 404 can select the top 5 longest lines or can sort the lines by length and select lines in the top $15^{th}$ percentile. The line selector 404 can incorporate one or more approaches to select lines that are likely to provide an accurate indication of the overall skew of the page. For example, the line selector 404 can discard or ignore lines in which too many small characters, such as punctuation, have been filtered out.

The slope aggregator 406 can generate an aggregate slope for the lines by calculating a slope for each selected line, and performing some aggregation operation, such as averaging the calculated slopes. The slope aggregator 406 can alternately assign a weight to lines based on their likelihood to indicate the skew of the page. The weight assigned to lines may be based on the line length, for example. Longer lines provide more information which can provide a more accurate result of a skew calculation, so the system can assign a higher value, such as 1 or 0.9 to long lines, and assign a lower value, such as 0, 0.1, or 0.25, to short lines. While the examples set forth herein of the slope aggregator 406 describe averaging the slops, the slope aggregator 406 can, in other embodiments, apply a median or mode operation to the slopes or perform some other calculation using the slopes of all or part of the lines of text in a scanned image. Then the image rotator 408 uses the average slope for the lines to rotate the scanned image. For example, in FIG. 2, the image rotator 408 would rotate the image 200 so that the skewed line 208 aligns more closely with the vertical line 206.

Figure 5:
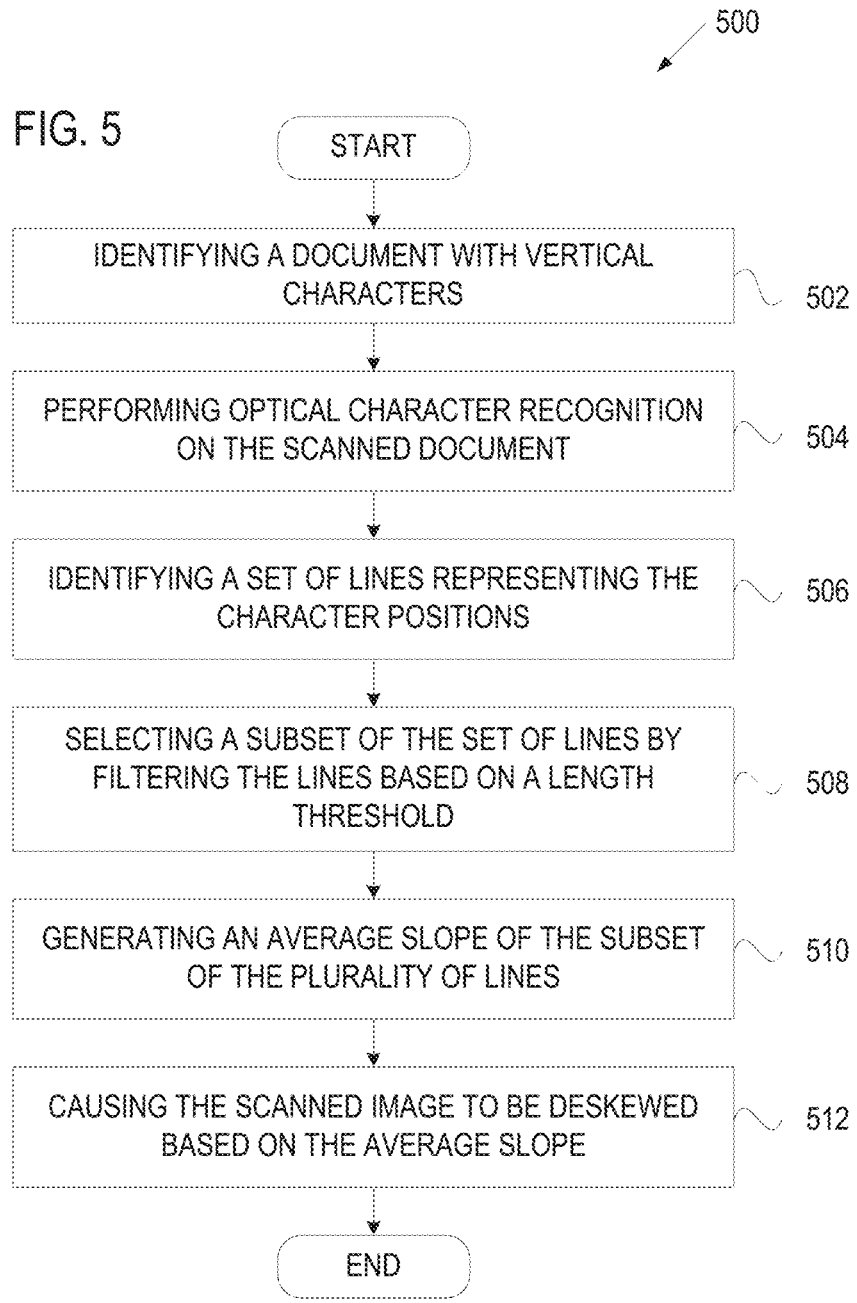
FIG. 5 illustrates a flow diagram of one embodiment of a method for scanning an image of vertical text to determine vertical lines, filtering the vertical lines, and deskewing the image.
Figure 6:
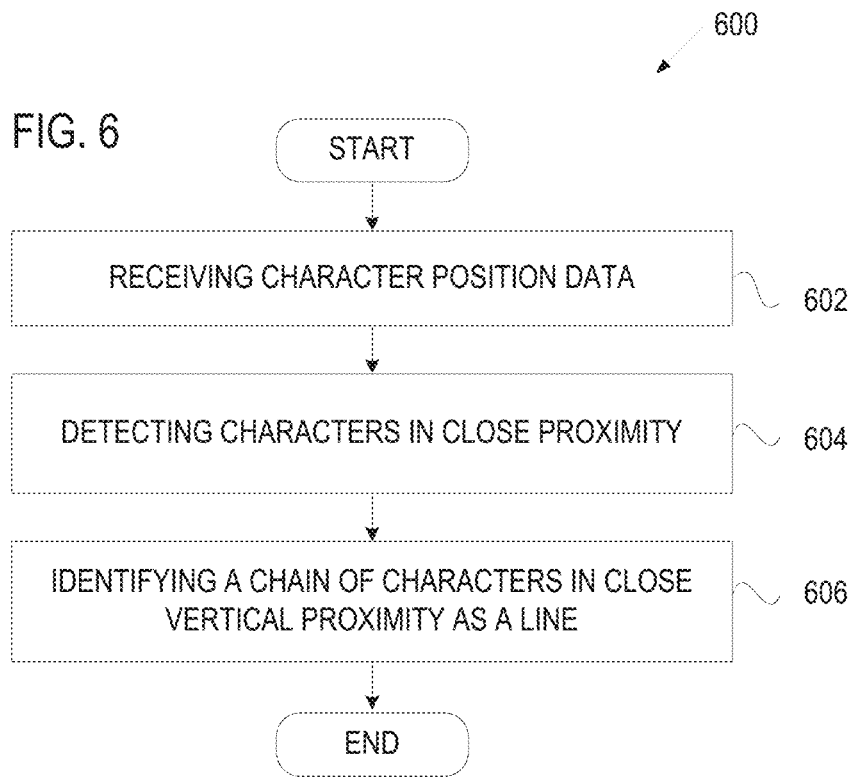
FIG. 6 illustrates a flow diagram of one embodiment of a method for identifying lines representing the character positions of the vertically oriented characters.

FIG. 5 illustrates a flow diagram of one embodiment of a method for scanning an image of vertical text to determine vertical lines, filtering the vertical lines, and deskewing the image. A system configured to practice the method first scans an object having printed thereon vertically oriented characters to yield a scanned image (502). The system performs optical character recognition (OCR) on the scanned image to yield character positions (504). The system identifies a plurality of lines representing the character positions of the vertically oriented characters (506). These lines may be specified by the OCR component or be determined by the system. FIG. 6 illustrates one embodiment of a method for identifying the lines in a scanned image.

Referring to FIG. 6, the system receives character position data for a scanned image (602). The character position data can be formatted such that the character position data is indicated as the center of a character, the top left of a character, the four corners of a bounding box for the character, and so forth. The system parses the character position data to detect characters in close proximity (604). In one embodiment, the system detects and discards characters, whether throughout a line or just at the ends of a line, which are not representative of the line or which may distort the position of the line. For example, punctuation characters, such as a period, comma, single quote, semicolon, diacritical marks and so forth, are not always positioned similarly to other, larger characters. Some languages have other characters which are similarly not positioned in the line consistently with other characters. Even a single stray data point in a line, such as the off-center or otherwise inconsistent location of a punctuation mark or similar character can adversely affect calculation of the proper slope for that line. Accordingly, the system can filter out these characters when identifying chains of characters for a line and when calculating the slope for those lines. The system can identify which characters to filter based on a recognized character type, a character size or a character position, for example. In one embodiment, the system filters character types matching a blacklist of characters known not to conform to standard character positioning in a line, or filters characters not matching a whitelist of characters.

The system can then identify a chain of characters in close vertical proximity as a line (606), and use the character position data of the chain of characters to generate a line representing the column of characters. In one example, the system uses character position data for each character in the chain, but the system can alternately use less character position data, such as the character position data of the top character, the bottom character, and one or more mid-points between the top and bottom characters.

Figure 7:
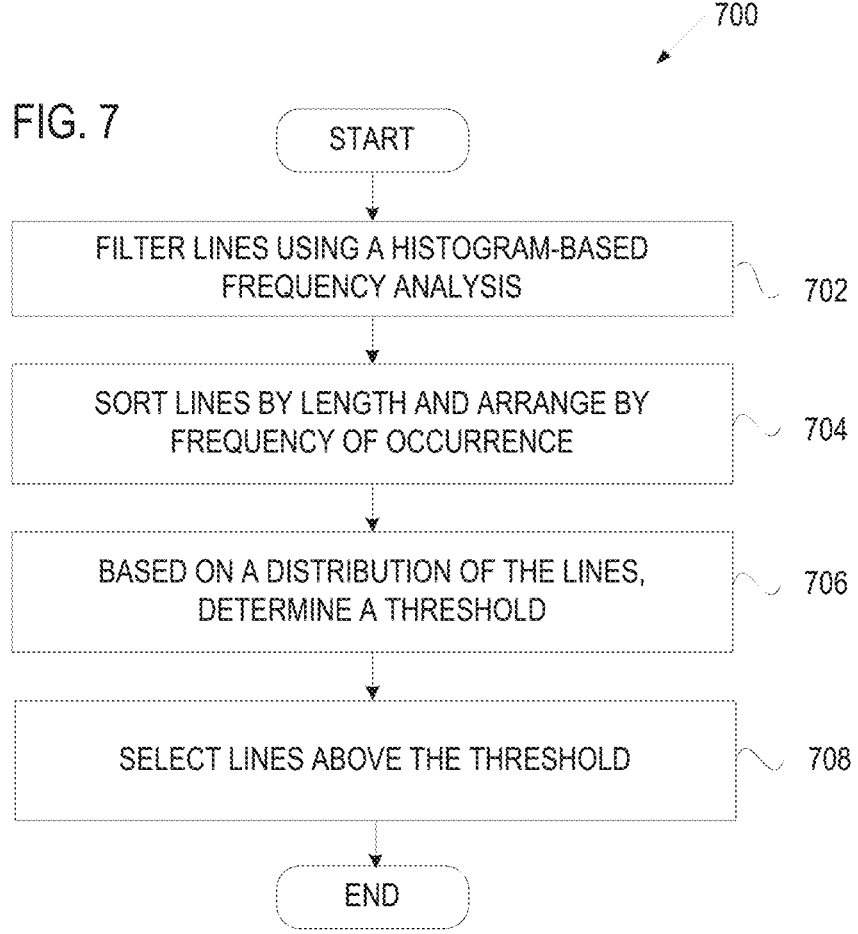
FIG. 7 illustrates a flow diagram of one embodiment of a method for selecting a subset of lines for the determination of an average slope.

Returning to FIG. 5, upon identifying the plurality of lines representing the character positions of the vertically oriented characters, the system selects a subset of the plurality of lines by filtering the plurality of lines based on a length threshold (508). FIG. 7 illustrates one embodiment of a method for selecting the subset of lines. The system can filter the lines identified at block 506 using a histogram-based frequency analysis (block 702) that groups lines by length, and arrange the groups in increasing order of frequency of occurrence (block 704). Based on the distribution of the lines, the system can determine a threshold (block 706), such as a minimum number or minimum quality of lines expected to produce a sufficiently accurate average slope. Then the system can select all or part of the lines above the threshold (block 708). The system can then analyze the first group which covers a certain percentage of lines in the entire page to determine a length. That length, called a bin-width, can be used as a unit for further analysis. The system can select lines having a length within a certain percentage of the bin-width from the list of detected lines, and calculate slopes of each of these lines. The system can perform another histogram frequency analysis on the set of calculated slopes. The system can group valid slopes belonging to slopes near the most frequent slope and calculate an average slope from these valid slopes. The resulting average slope indicates the skew angle of the page, which the system can use in an arctangent trigonometric function to calculate the angle at which to deskew the page. The system can deskew the page or can pass parameters to an image manipulation subsystem to deskew the image. When the page is deskewed, the scanner coordinates are highly correlated to the page coordinates and can be incorporated as part of an eBook or other electronic document.

Referring back to FIG. 5, the system generates an average slope of the subset of lines (510). In one embodiment, the system generates respective slopes for each line in the subset, and averages the respective slopes. The system causes the scanned image to be deskewed based on the average slope (512), and can optionally output the deskewed scanned image as part of an electronic document or eBook. The system can cause the scanned imaged to be deskewed by directly manipulating the scanned image via an image rotation algorithm, for example. In another embodiment, the system commands an image manipulation subsystem, such as a photo manipulation program or an image editor, to deskew the scanned image. The system can send such commands with parameters based on the average slope.

In one embodiment, the system evaluates the image after deskewing to determine accuracy or to ensure that the accuracy meets a satisfactory threshold, such as 1 in 1000 or 1 in 10,000. If the image is below an accuracy threshold, the system can instruct the image conversion utility to perform additional skewing. The system can perform additional slope and line measurements, request a higher resolution of the source scanned image, provide a message to a user that the document is corrected but that additional corrections may be desirable, and so forth. The system can further iterate additional deskewing based on the average slope until a desired vertical orientation for the lines is achieved.

Figure 8:
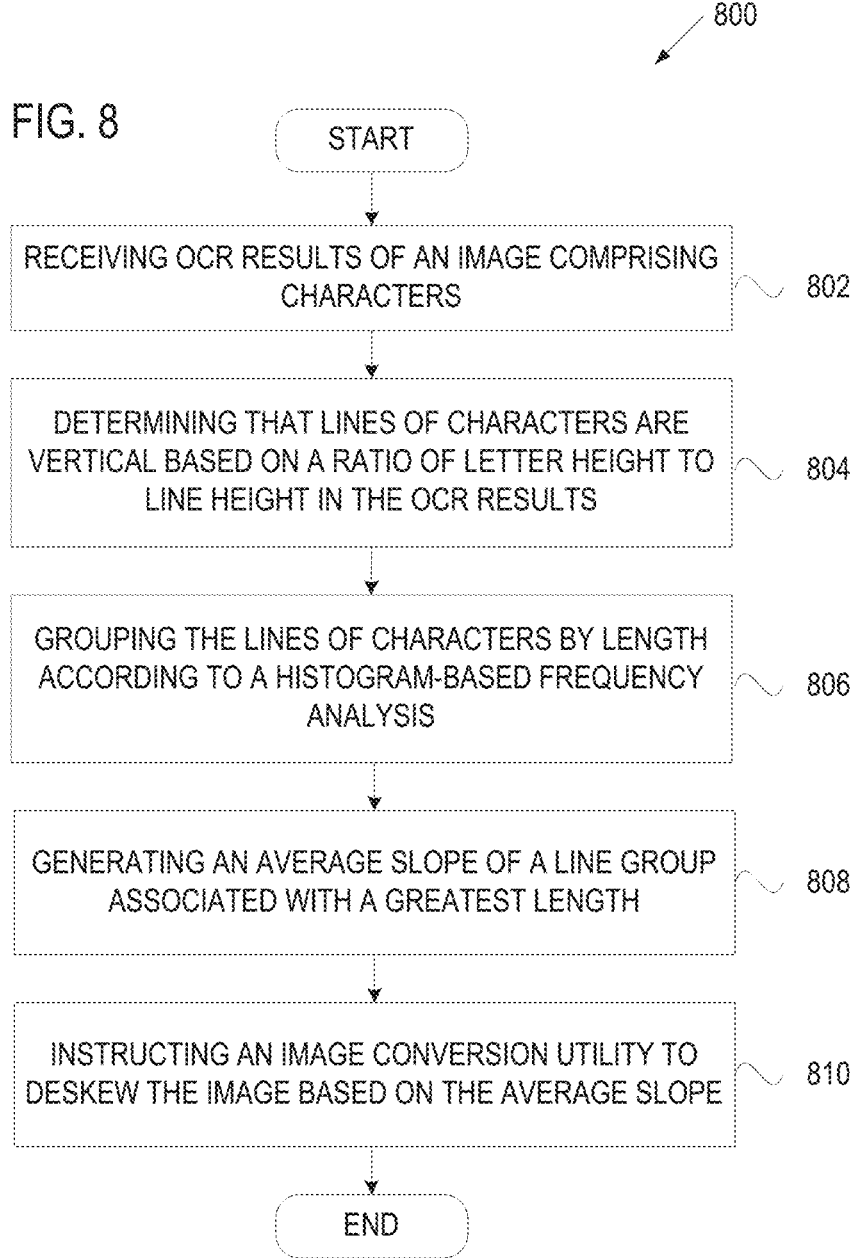
FIG. 8 illustrates a flow diagram of one embodiment of a method for detecting that a scanned image contains vertical text based on a ratio of letter height to line height.

FIG. 8 illustrates a flow diagram of one embodiment of a method for detecting that a scanned image contains vertical text based on a ratio of letter height to line height. The example system receives optical character recognition (OCR) results of an image comprising characters (802). The system determines that lines of characters are vertical based on a ratio of letter height to line height in the OCR results (804). When an orientation for a line of characters is unavailable or is less then a certainty threshold, the system can assign the line of characters a previous orientation of an immediately preceding line of characters, for example.

The system groups the lines of characters by length to yield line groups according to a histogram-based frequency analysis (806). The system can define, for a respective line, horizontal offsets and vertical offsets as the difference of the horizontal corner boundaries and vertical corner boundaries of the respective line from a baseline. The baseline is an imaginary line on which a set of characters are located. Then the system can identify respective lines having a respective letter height larger than a respective line height as vertical, and identify respective lines having a respective letter height smaller than a respective line height as horizontal. The system generates an average slope of a line group associated with a greatest length (808), and instructs an image conversion utility to deskew the image based on the average slope (810). In one embodiment, the system instructs the image conversion utility to deskew only those portions of the image that contain vertical lines of characters.

In one embodiment, the system handles pages with some vertical lines and some horizontal lines. For example, the system can identify a first skew value using a group of vertical lines and a second skew value using a group of horizontal lines. Then, the system can weight the first and second skew values to determine an overall page skew value, and deskew the page based on the overall page skew value. For example, if 20% of the text on the page is horizontal, and 80% of the text is vertical, then the system can combine the horizontal and vertical skew values in corresponding proportions to determine the overall page skew value. In another embodiment, the system determines which group of text, i.e. horizontal or vertical, is larger on that page, and uses only the skew value for the larger group. In yet another embodiment, the system uses some combination for the horizontal and vertical skew values when the larger of the two groups of text is below a threshold. If the larger of the two groups is above a threshold, such as 90% of the page, then the system can exclusively use the skew value of the larger group of text for that page. Similarly, the system can incorporate other indications of skew when calculating a skew of the overall page, such as a printed line separating or dividing columns or rows of text or an edge or border of an illustration.

Figure 9:
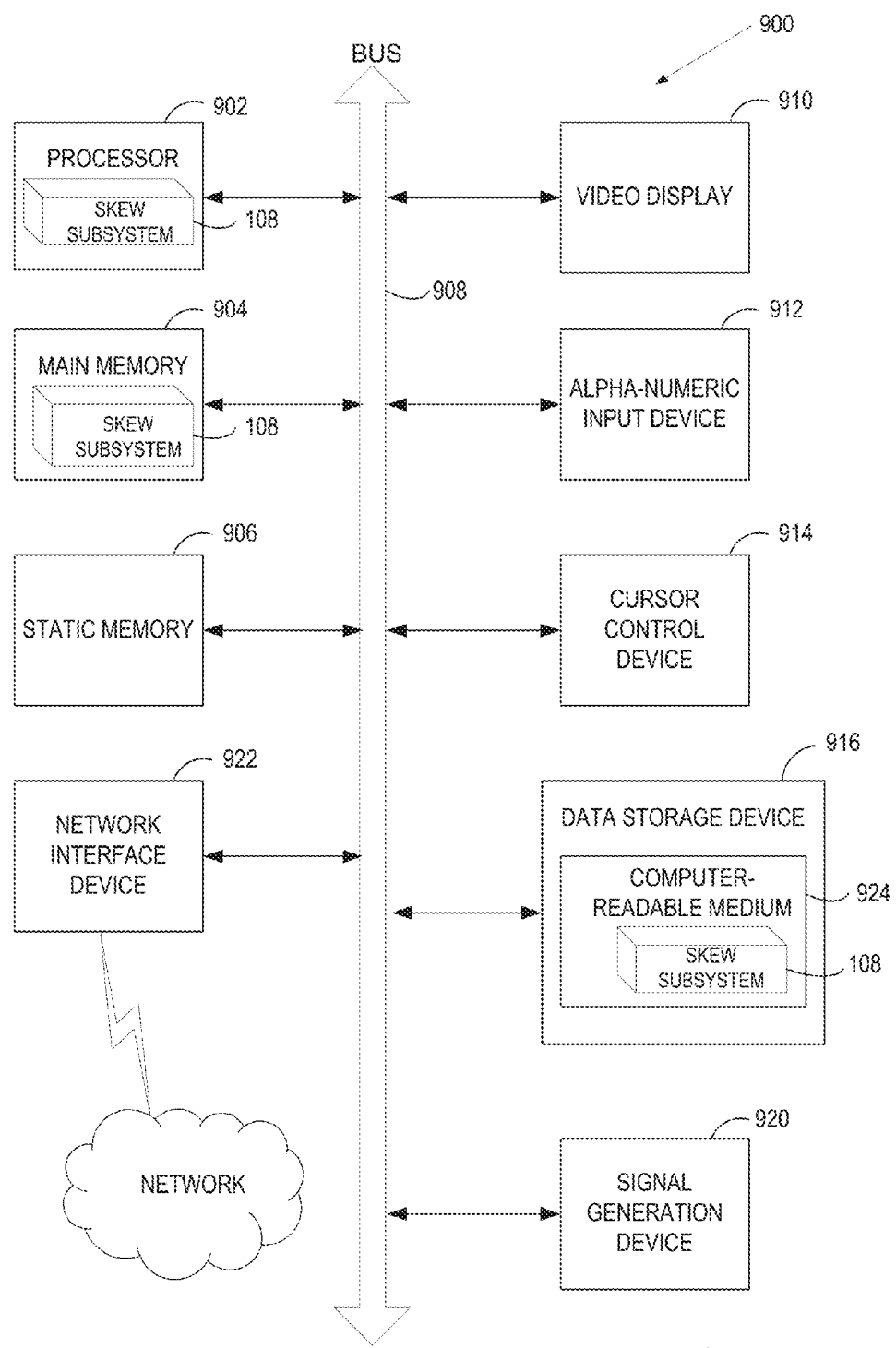
FIG. 9 illustrates a block diagram of one embodiment of a user device.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute processing logic (e.g., instructions 926) for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), other user input device such as a touch screen or a microphone, and a signal generation device 920 (e.g., a speaker).

The secondary memory 918 may include a machine-readable storage medium (or more specifically a computer-readable storage medium) 924 on which is stored one or more sets of instructions 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

The computer-readable storage medium 924 may also be used to store instructions which may correspond to the skew processing subsystem 108 of FIG. 1, and/or a software library containing methods that call a skew processing subsystem 108. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "scanning", "performing", "determining", "selecting", "generating", "deskewing", "instructing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
identifying, by a processing device, a scanned image of an object having printed thereon text comprising characters oriented for a vertical reading direction, the characters arranged in a plurality of substantially vertical columns;
performing, by the processing device, optical character recognition (OCR) on the scanned image to yield character positions;
identifying, by the processing device and based on the character positions, a plurality of substantially vertical lines corresponding to the plurality of substantially vertical columns;
determining, by the processing device, lengths of the plurality of substantially vertical lines;
selecting, by the processing device, a subset of the plurality of substantially vertical lines, wherein a length of each substantially vertical line in the subset of the plurality of substantially vertical lines exceeds a length threshold;
generating, by the processing device, an average slope of the subset of the plurality of substantially vertical lines from a vertical reference line; and
causing, by the processing device, the scanned image to be deskewed based on the average slope.

2. The method of claim 1, further comprising:
outputting, by the processing device, at least a portion of the characters as part of an electronic document.

3. The method of claim 1, further comprising:
identifying a skew angle and a center of rotation based on the average slope and the plurality of substantially vertical lines, wherein causing the scanned image to be deskewed is further based on the skew angle and the center of rotation.

4. The method of claim 1, wherein the character positions are represented in a coordinate system of the scanning device.

5. A system comprising:
a memory;
a processing device operatively coupled to the memory, the processing device to:
identify an image of text comprising characters oriented for a vertical reading direction;
identify a plurality of vertical lines corresponding to character positions of the characters in the image;
generate an average slope of a subset of the plurality of vertical lines, wherein a length of each vertical line in the subset of the plurality of vertical lines exceeds a length threshold; and cause the image to be deskewed based on the average slope.

6. The system of claim 5, wherein, to cause the image to be deskewed based on the average slope, the processing device is to:
determine a representative line for the image; and
instruct an image manipulation utility to deskew the image based on a trigonometric function for the representative line.

7. The system of claim 5, wherein the processing device is further to:
generate a respective slope for a line by applying an inverse of a trigonometric tangent operation to a ratio of total drift between positions of a top-most character in the line and a bottom-most character in the line.

8. The system of claim 5, wherein the processing device is further to:
select the subset of the plurality of vertical lines based on a median length of the plurality of vertical lines.

9. The system of claim 5, wherein the processing device is further to:
select, as the subset of the plurality of vertical lines, lines in a top percentile group identified based on a histogram analysis.

10. The system of claim 5, wherein the processing device is further to:
output at least a portion of the image, after deskewing, as part of an electronic document.

11. The system of claim 10, wherein the processing device is further to:
map scanner coordinates associated with optical character recognition of the image to page coordinates in the electronic document.

12. The system of claim 6, wherein the image manipulation utility is a third party image processing application.

13. A non-transitory computer-readable storage medium having instructions encoded thereon which, when executed by a processing device, cause the processing device to perform operations comprising:
determining, based on optical character recognition (OCR) results of an image of text comprising characters oriented for a vertical reading direction, a plurality of vertical lines representing character positions of the characters;
determining a median line length of the plurality of vertical lines;
selecting, as a subset of the plurality of vertical lines, each line of the plurality of vertical lines having a length longer than the median line length;
generating an average slope of the subset of the plurality of vertical lines; and
causing the image to be deskewed based on the average slope.

14. The non-transitory computer-readable storage medium of claim 13, wherein the operations further comprise:
outputting at least a portion of the image, after deskewing, as part of an electronic document.

15. The non-transitory computer-readable storage medium of claim 13, wherein determining the plurality of vertical lines is based on character positions in the OCR results.

16. The non-transitory computer-readable storage medium of claim 13, wherein the operations further comprise:
evaluating the image after deskewing to determine accuracy;
responsive to the accuracy being below a threshold, instructing an image conversion utility to perform additional skewing.

17. The non-transitory computer-readable storage medium of claim 13, wherein causing the image to be deskewed based on the average slope comprises:
determining a skew value by applying an inverse of a trigonometric tangent operation to a ratio of total drift between positions of the first character and last character on the image; and
instructing an image manipulation utility to deskew the image based on the skew value.

18. The non-transitory computer-readable storage medium of claim 13, wherein generating the average slope of lines comprises:
sorting the plurality of lines by length according to a histogram-based frequency analysis, to yield sorted lines;
selecting a top N-th percentile of the sorted lines to yield a selected group of lines; and
averaging respective slopes for the selected group of lines.

19. The non-transitory computer-readable storage medium of claim 13, wherein causing the image to be deskewed based on the average slope comprises:
identifying a skew angle and a center of rotation for the image based on the average slope and a percentile threshold of the plurality of lines; and
instructing an image manipulation utility to deskew the image based on the skew angle and the center of rotation.

* * * * *